United States Patent [19]

Crain

[11] 4,445,496
[45] May 1, 1984

[54] WOOD BURNING HEATER PROVIDING IMPROVED UNIFORM TEMPERATURE OUTPUT

[76] Inventor: George F. Crain, Rte. 2, Elmwood, Ill. 61529

[21] Appl. No.: 376,668

[22] Filed: May 10, 1982

[51] Int. Cl.³ .............................................. F24C 1/14
[52] U.S. Cl. ...................................... 126/61; 126/77; 126/71
[58] Field of Search .................... 126/61, 65, 109, 108, 126/113, 197, 99 A, 71, 77, 126, 123, 296, 292, 70, 72; 239/34, 50, 59; 98/105; 236/78 R

[56] References Cited

U.S. PATENT DOCUMENTS

| | | | |
|---|---|---|---|
| 31,892 | 4/1861 | Leeds | 126/112 |
| 921,019 | 5/1909 | Speer | 126/112 |
| 1,636,089 | 7/1927 | Blackman | 237/78 R |
| 1,663,937 | 3/1928 | Ehrich | 126/77 |
| 4,184,473 | 1/1980 | McIntire | 126/77 |

Primary Examiner—Samuel Scott
Assistant Examiner—G. Anderson
Attorney, Agent, or Firm—McCaleb, Lucas & Brugman

[57] ABSTRACT

A solid fuel burning heater with improved efficiency in burning logs. A housing is divided by a louvered internal wall into front and back sections having combustion and heating chambers respectively. The louvered wall terminates below the top of the housing providing a crossover space through which hot, combusted gases flow from the combustion chamber to the heating chamber. A vertical heat transfer duct extends through the top and bottom of the housing and has open ends in free communication with external ambient air. Front and rear flues are connected to the combustion and heating chambers and these are interconnected by a main flue leading to a chimney. A damper is provided in the front flue. The combustion chamber comprises a primary combustion zone on a fuel-supporting grate and a secondary combustion zone above it. Adjustable draft openings at the front of the housing control air input to the combustion zones. A draft tube with an open inlet end at the back of the housing extends forwardly and upwardly through the heating chamber to preheat air within it and has exit openings in the secondary combustion zone. A valve in the draft tube precisely controls the volume of secondary air input for long term maintenance of a banked fire with minimum smoke generation.

6 Claims, 6 Drawing Figures

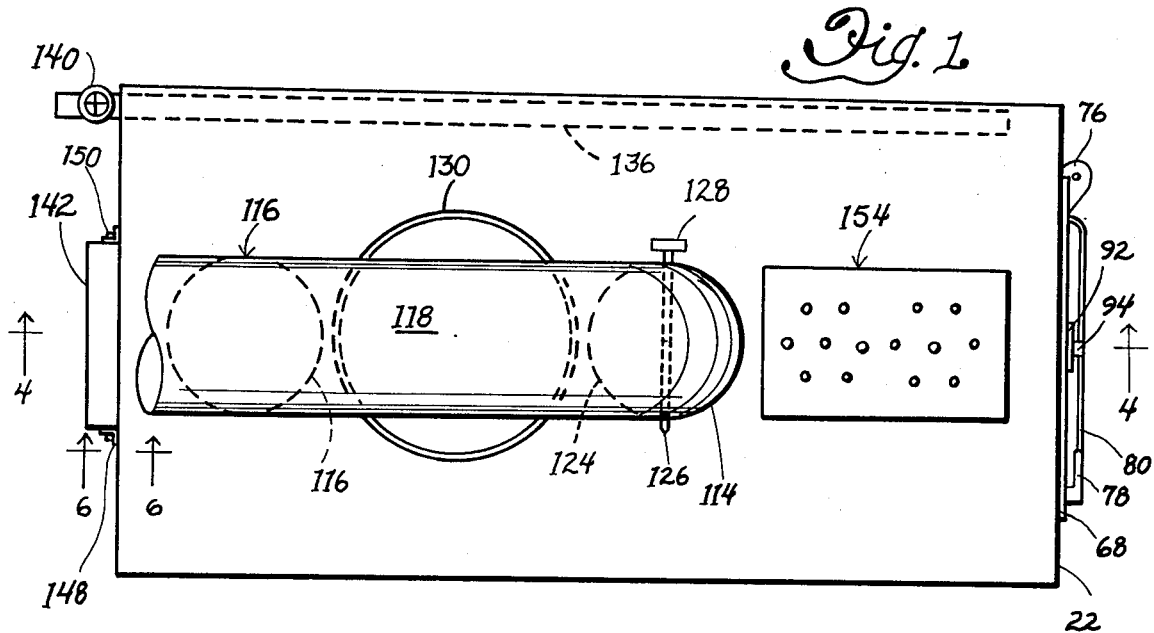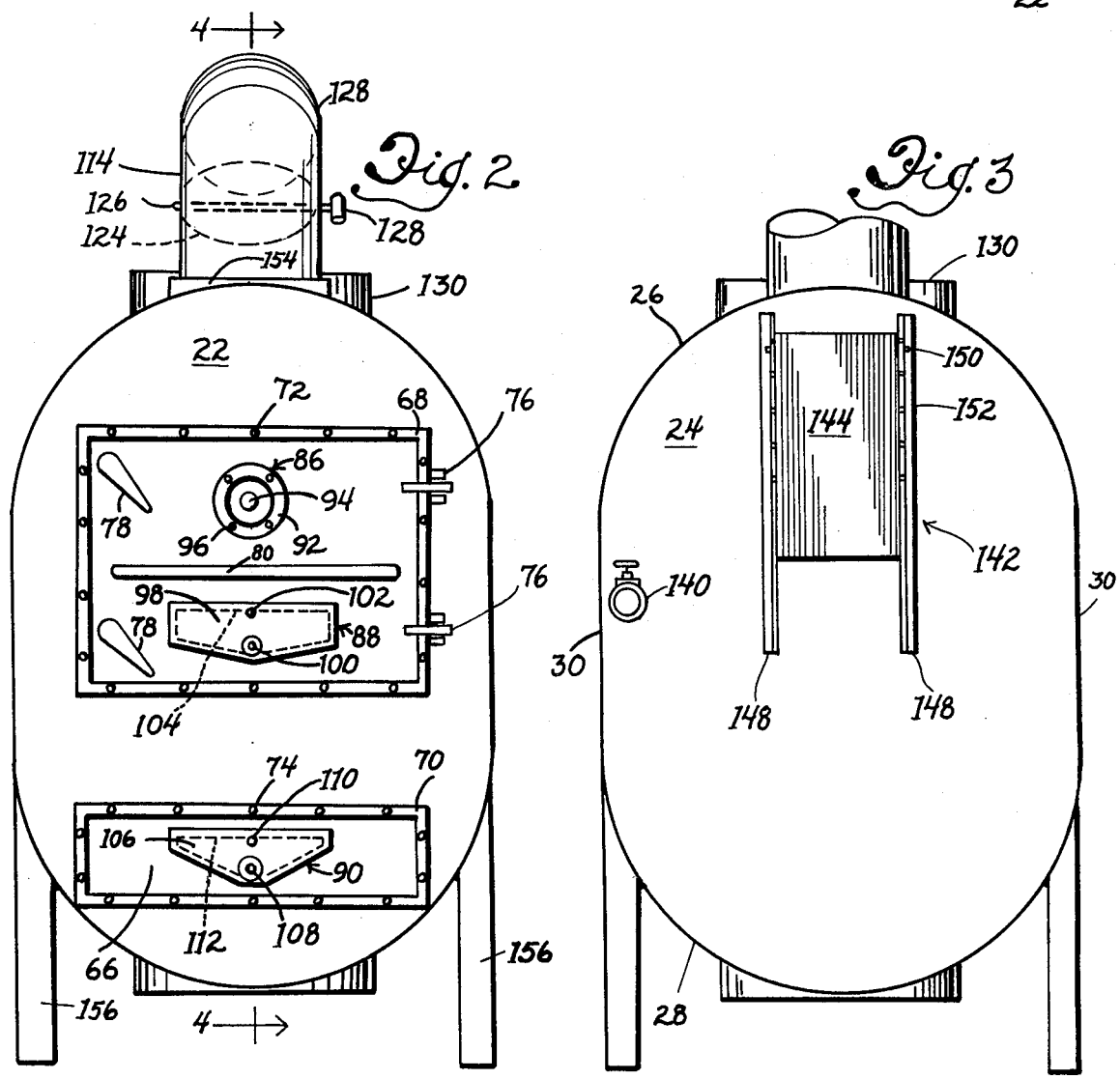

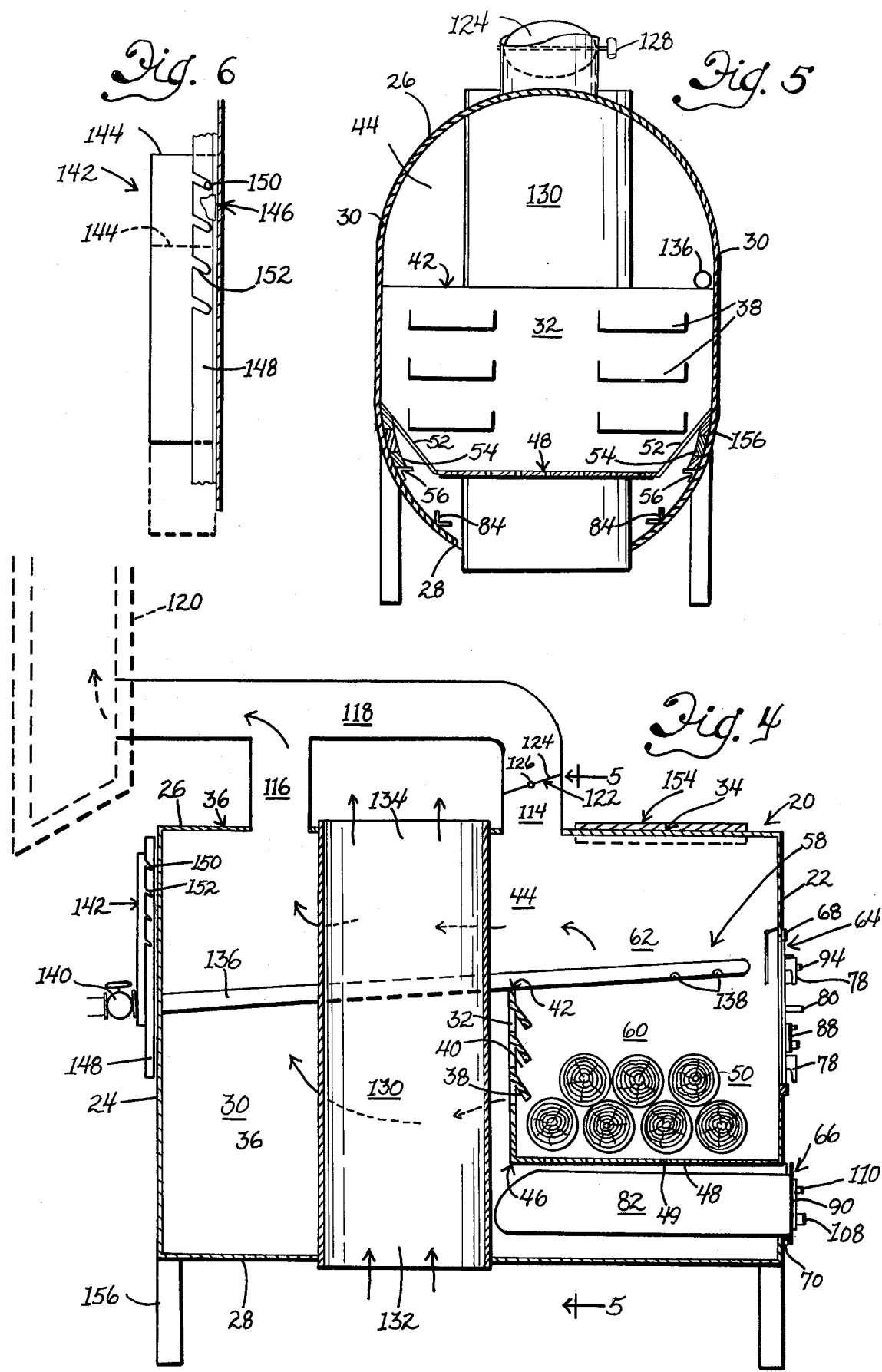

WOOD BURNING HEATER PROVIDING IMPROVED UNIFORM TEMPERATURE OUTPUT

BACKGROUND OF THE INVENTION

This invention relates generally to solid fuel burning heaters. More specifically, it relates to a log or coal burning heater capable of maintaining a uniform heat output for extended times with a single fuel load, and capable of burning fuel completely at extremely slow combustion rates such as when a fire is banked overnight or minimal heat demands are placed on the heater.

Wood and coal burning heaters are, of course, well known. However, it has always been difficult to regulate the amount of air fed to such heaters and to control fuel consumption. Most have been inefficient and dirty, have required re-fueling at short intervals and many would not even hold a banked fire overnight.

Typically, a wood or log burning heater runs very hot at first and then tapers off; and, when the fire is banked for the night, it burns itself out before morning and has to rekindled.

Complete burning occurs in two stages: primary combustion on the grate where logs are converted to smoky, incompletely burned, air-borne particles, carbon monoxide, and the like; and secondary combustion, where the air-borne smoke and carbon monoxide are cleanly converted to carbon dioxide and water and minor quantities of other completely oxidized components. Too little air prevents complete combustion, leaves ashes in the heater, and produces smoke which is highly visible and objectionable. To avoid smoke, a heater is generally oversupplied with air causing rapid combustion and an unnecessary loss of heat into the room and up the chimney. Attempts to restrict and control the air supply to prolong burning at a low rate all too often results in the fire going out.

It is difficult to maintain a banked or low heat output fire with very low flow rates of cold, ambient air. The cold air simply cools the embers and the gases to or below the ignition temperature causing burning to be very inefficient and smoky before it eventually goes out. On the other hand, pre-heating of the air fed to a banked fire enables it to burn completely, even at a very low combustion rate.

SUMMARY OF THE INVENTION

Therefore, a principal object of the present invention is to provide a solid fuel burning heater which completely burns fuel such as logs and coal to provide uniform heat output for extended periods with infrequent reloading of fuel, and which is capable of sustained low level combustion enabling it to be banked overnight without losing the fire.

The heater, in accordance with the present invention, comprises a housing having separate combustion and heating chambers with a crossover space between them enabling the flow of hot combusted gases to the heating chamber, a vertical heat transfer duct in the heating chamber connected through bottom and top portions of the housing to convey ambient air upwardly through it by convection when the duct is heated, separate front and rear flues being connected to the combustion and heating chambers, a main flue interconnecting the front and rear flues to provide an outlet connection to a chimney, and damper means in the flue connected to the combustion chamber effective when opened to divert combusted gases directly to the chimney and bypass the heat transfer chamber. The combustion chamber includes a primary combustion zone on a grate, and a secondary combustion zone in a space above it. The damper means is normally closed to direct hot combusted gases to the heating chamber. The vertical heat transfer duct has a large open cross section area with a width approximately half that of the heater housing.

Another object of the invention is to provide a valve-controlled draft tube with an air inlet opening externally of the housing and an air outlet opening in the combustion chamber, a portion of the draft tube extending through the heating chamber to thereby feed a controlled volume of pre-heated ambient air to the combustion chamber to maintain a banked, clean-burning fire during times of low heat demand.

Another object is to incline the draft tube upwardly toward the combustion chamber to facilitate convection flow of ambient outside air within the tube and to prevent the outflow of combusted gases to the room being heated.

Another object is to position the main flue directly above the upper, outlet end of the heat transfer duct to enhance transfer of heat from the main flue to the air exiting from the duct, and to deflect the heated air to a comfort level in the room substantially below the ceiling.

Another object is to provide room humidifying means comprising an open-top water container in flatwise, heat-transfering relation to one of the heater housing walls, and to provide means for adjusting the vertical position of the container in areas of different temperatures to thereby vary the evaporation rate of the water.

Other objects and advantages will be apparent from the following description taken in connection with the accompanying drawings.

BRIEF DESCRIPTION OF THE DRAWINGS

FIG. 1 is a top plan view of a solid fuel burning heater illustrating a preferred form of the present invention;

FIG. 2 is a front view of FIG. 1;

FIG. 3 is a back view of FIG. 1;

FIG. 4 is a longitudinal sectional view of FIG. 1 taken on line 4—4;

FIG. 5 is a transverse sectional view of FIG. 4 taken on line 5—5; and

FIG. 6 is an enlarged sectional view of FIG. 4, taken on line 6—6 of FIG. 1.

Like parts are indicated by like reference characters throughout the drawings.

DESCRIPTION OF THE PREFERRED EMBODIMENT

Referring now to the specific embodiment of the invention in the drawings, the improved solid fuel burning heater comprises a housing 20 having front, back, top, bottom and sidewalls 22, 24, 26, 28 and 30 respectively. Although the front and back end walls are oval shaped and the top and bottom walls are cylindrical sections in the embodiment illustrated, other housing shapes may be employed. The housing has four legs 156 fastened as by welding.

A louvered divider wall 32 is fastened as by welding between the side walls 30, 30. It is shown about half way between the front and back end walls and approximately evenly divides the housing into front and back sections 34 and 36. The divider wall has a series of louvers 38 with spaces 40 therebetween for the passage of combusted gases as will be explained. The upper edge 42 terminates substantially below the top of the housing providing a large area crossover space 44 for the passage of combusted gases. The lower edge 46 terminates at the level of a fire grate 48, with apertures 49, on which logs 50 or other solid fuel will be burned. As shown in FIG. 5, the grate is supported inwardly, out of contact with side walls 30, 30 by inwardly inclined brackets 52. To further protect the side walls from glowing coals on the grate, firebox liners 54 may be supported on channels 56.

The front section 34 therefore consists of a combustion chamber 58 which comprises a primary combustion zone 60 and a secondary combustion zone 62 immediately above where the smoke and volatile fuel components are completely burned if the temperature and oxygen supply are properly maintained.

The front wall 22 has an upper, fuel-loading firebox door 64 and a lower ash removal door 66. The doors are mounted within rectangular frames 68 and 70 which are mounted to the front wall by bolts 72 and 74. The upper door is mounted on hinges 76 which are fastened to the frame. Conventional latches 78 hold the door closed. A handle 80 is provided.

The lower door 66 is the outer end of a rectangular ash pan 82 which is slidably mounted below the grate on angle iron tracks 84 fastened as by welding to the inside of the bottom wall as shown in FIG. 5.

Draft means is provided at the front of the heater housing and is adjustable to direct primary and secondary air into the combustion chamber to suit various operating modes of the heater. As shown here, the draft means is provided in the doors themselves, but all or part thereof may be located in the front wall itself if desired. Upper draft control 86 and middle draft control 88 are mounted in the firebox door. Lower draft control 90 is mounted in the ash pan door. Only the draft controls in the firebox door are needed for firewood. The draft control in the ash pan door is used when burning coal.

These draft controls may be of conventional types so will not be described in detail. Briefly, upper draft control 86 is a circular plate 92, rotatable by knob 94 to place a series of holes 96 in various degrees of registration with a similar set of underlying holes (not shown). This regulates the inflow of secondary air into the combustion chamber at the level of the top half of the firebox door and is used for slow burning.

Middle draft control 88 comprises a plate 98 swingable by knob 100 about a pivot pin 102 to uncover an air inlet opening 104 in the door. This regulates the inflow of primary air into the primary combustion zone and is used for fast burning.

Lower draft control 90 is similar to control 88. It comprises a plate 106 swingable by knob 108 about a pivot pin 110 to uncover an air inlet opening 112 in the ash pan door. This regulates air flowing upward through holes 49 in the grate.

Front and back vertical flues 114 and 116 are connected to the housing sections 34 and 36 respectively. A main flue 118 interconnects them and carries spent combustion gases forwardly to a chimney 120. A damper 122 with a plate 124 on a manually pivotable shaft 126 is provided in the front flue for special control purposes to be described. An external handle 128 is provided to operate the damper.

Turning now to the back section 36, this comprises a heating chamber separate from the combustion chamber in the front section 34. A vertical heat transfer duct 130 extends through the top and bottom walls of the housing and is fastened and sealed as by welding. As a result of the heat applied to the duct by the hot gases in the heat transfer chamber 36, air moves upwardly by convection in the duct, drawing cool air into the room at the bottom open end air inlet 132 and discharges it, heated, from the top open end air exit 134. For best operation in establishing an effective convection which will rapidly transfer heat from the chamber 36 to the room air, the duct 130 should be a single, large cross section tube or pipe of any convenient cross section, and not broken up into a plurality of smaller ducts, as for example the heat tubes 37 shown in Young Patent 2,475,120. Further, the duct cross section should be uniform from bottom to top, or taper gradually to a slightly smaller area at the air outlet 134 to cause the velocity of the air to increase as it is heated, expands, and rises; the duct cross section should not be larger at the upper end, as shown in the above-mentioned Young patent. Still further, the inside of the duct should be smooth and uncluttered by ridges, filaments, mesh or other elements intended to increase the heat transfer rate, because these tend to obstruct air movement and collect dust and lint and slow down the air velocity. A most important factor in transferring heat from the inner wall of the duct 130 to an upwardly moving column of air inside it is that the duct surface be smooth so the air velocity will be high enough to prevent the formation of a stagnant, heat-insulating layer of air which would inhibit heat transfer to the air.

While it is desirable to make the cross section of the heat transfer duct 130 as large as possible, this must not be carried to the extreme of reducing the area of heat transfer in chamber 36 to the point of restricting flow of combustion gases through it. As a practical compromise, the diameter of duct 130 should be about one-half the width of the housing. For example, in one heater utilizing the principles of the present invention, width between side walls 30, 30 was twenty eight inches and the diameter of the duct 130 was twelve inches.

An important feature of the invention is the precision draft control when the heater is banked for the night, or otherwise required to produce only minimum heat output. This draft control consists of a draft tube 136 which extends forwardly through the back section heat transfer chamber 36 into the combustion chamber in the front section 34 where it has air outlet openings 138 in the upper part of the firebox. At the rear end, a draft control gate valve 140 is provided to insure precise draft control. The valve may be connected as shown to receive ambient air from the room in which the heater is located, or the draft tube may be extended to receive air from the outside. By passing the draft tube through the heat transfer chamber 36, air is pre-heated, enabling complete combustion to proceed in the secondary zone 62, even at the very low flow rate suitable for banking the fire at night and during other periods of low heat demand when the exact combustion rate can be precisely controlled by the valve 140. During such low heat output operation, the front draft controls 86, 88 and 90 may be closed, or the lower or middle draft control 88 or 90 may be cracked just slightly to enable a small trickle of primary air to enter the combustion zone. As best shown in FIG. 4, the draft tube 136 will be angled upwardly to place the outlet end at a higher level than the inlet end. This facilitates convection flow of air through the tube into the combustion chamber in the front section 34 and prevents outflow of combusted gases through the tube.

A humidifying means 142 is provided on the back wall 24. This comprises an open top water container 144 made of sheet steel or some other suitable heat conductive material having a flat, vertical surface 146 in heat conductive engagement with the back wall 24. It is mounted between a pair of vertical angle iron guides 148, 148 by a pair of pins 150, 150 engaged in diagonal slots 152 in the angle irons. Inasmuch as the temperature of the back wall increases from bottom to top, the evaporation rate can be adjusted simply by varying the vertical position of the container by hanging it between different pairs of slots 152 as shown in solid and broken lines in FIG. 6. In actual service, experimentation will quickly show which position provides the desired evaporation rate.

In normal operation, the damper 122 in the front flue is kept closed except in the following three special situations.

1. To carry off smoke which otherwise might come out the open door when the firebox door is opened.
2. To release excess heat directly into the chimney instead of adding unwanted heat to the duct 130 when the heater is overheated.
3. To burn soot or creosote out of the chimney, or to warm up the chimney when cold so it will draw properly.

A warming or cooking plate 154 is provided on the top wall of the housing immediately over the combustion chamber.

Use and operation of the heater is believed to be evident from the above description. Briefly, however, logs or other solid fuel 50 will be ignited on the grate 48. The draft controls in the front doors will be suitably adjusted for fast or slow combustion as desired. Hot combusted flue gases pass through the spaces 40 in the louvered divider plate, and through the overhead crossover space 44, into the heat transfer chamber 36 where it impinges on the duct 130 and passes completely around it on both sides, escaping up the rear flue 116 to the chimney. Air warmed in the duct rises and is replaced by cold air from the floor of the room. The main flue 118 is preferably placed in direct vertical line with air emitting from the upper end of the duct. This air impinges upwardly against the underside of the main flue and is deflected sidewise. This enhances further transfer of heat from the main flue, and directs the heated air usefully toward the comfort level in the room instead of allowing it to pass wastefully to the ceiling.

A heater employing the principles of this invention may be constructed in different sizes and shapes. One particular embodiment which has been made and extensively tested is illustrated in the drawings. The body was made of welded sheet steel and basic dimensions were as follows.

Length—sixty inches
Height (including legs)—fifty-two inches
Height of bottom wall 28 above floor—seven inches
Width—twenty-eight inches
Diameter of duct 130—twelve inches
Diameters of front and rear flues—seven inches
Firebox door opening—sixteen inches square
Diameter of draft control 86—four and one half inches
Size of draft holes 96—five eighths of an inch
Door openings for draft controls 88 and 90—one and one half inches by six inches
Humidifier container 144—eight and one half inches by thirteen inches by five inches In two consecutive heating years, a conventional single-chambered, wood-fired heater was compared with an experimental prototype of the present double-chambered heater. These comparisons were made by operating the conventional heater during one heating season and replacing it with the present double-chambered prototype during the succeeding heating season. The site chosen was a fifteen hundred square foot multi-level home built about 1974, located on a farm in western Illinois without benefit of other buildings for wind protection. It was well insulated and was provided with an electric furnace for back-up.

During October, November and December of 1980, the home was heated with the conventional heater, using a variety of mixed wood. To maintain the desired temperature required constant re-fueling and some assistance from the electric furnace, approximately ten percent. Approximately two hundred and thirty cubic feet of stacked wood was used during that period.

By comparison, after the prototype double-chambered heater was substituted, during October, November and early December of 1981, the desired temperature was maintained by re-fueling only once every twenty-four hours. During the latter part of December, when the weather became much colder, the desired temperature was maintained by refueling no more than twice in any twenty-four hour period. The same mixed wood variety was used for fuel as had been used the previous year. It required only one hundred and sixty cubic feet of stacked wood with no back-up assistance from the electric furance. This was a thirty percent saving in wood plus the saving in not operating the back-up electric furnace.

January 1982 was an unusually cold month with the temperature at times reaching $-18°$ F. with a wind chill factor of $-65°$ F. Even under these conditions, a nearly steady desired temperature was maintained for a minimum of eight hours without re-fueling. Without this chill factor, the same comfortable uniform temperature can be maintained for a minimum of twelve hours without re-fueling, with no assistance from the electric furnace.

During extremely cold weather, it takes eight to twelve hours for the temperature in the home to drop one to three degrees after re-fueling. During average cold weather, it takes twenty-four hours for temperature to drop that much after re-fueling. The floors are always warm, and ashes need be removed only once weekly. An extremely important part of the invention enabling such uniformity of heating, high efficiency, and complete combustion of fuel is obtained by adjusting the draft control valve 140 to provide a precisely metered input of pre-heated air to the combustion chamber.

While a particular example of the present invention has been shown and described, it will be apparent that changes and modifications may be made without departing from the invention in its broadest aspects. The aim of the appended claims, therefore, is to cover all such changes and modifications within the spirit and scope of the invention.

The embodiments of the invention in which an exclusive property or privilege is claimed are defined as follows:

1. A solid fuel burning heater comprising:

a housing having front, back, top, bottom, and side walls;

a louvered internal upstanding divider wall intermediate the front and back walls dividing the housing into front and back sections having combustion and heating chambers respectively therein, the louvered wall terminating a substantial distance below the top wall to provide internal overhead crossover space for combusted gases;

the front wall having draft control means including separately controllable primary and secondary air inlets to the combustion chamber;

a fuel-supporting grate between the front and louvered walls in the lower portion of the front section;

the combustion chamber comprising a primary combustion zone above the grate substantially co-extensive with the louvered wall, and a secondary combustion zone above the primary combustion zone and in communication with the crossover space above the louvered wall;

a vertical heat transfer duct in the heating chamber extending through the top and bottom walls of the housing and having open ends in free communication with external ambient air;

front and rear flues connected with upper portions of the combustion and heating chambers respectively;

a main flue interconnecting the front and rear flues and adapted to provide an outlet connection to a chimney;

damper means for the front flue adjustable to control flow of combusted gases therethrough and effective when opened to direct combusted gases to the main flue and bypass the heating chamber and rear flue;

a draft tube extending from a position externally of the housing into the combustion chamber between the primary and secondary combustion zones, the draft tube having air exit means in the combustion chamber; and control valve means in the draft tube enabling regulation of secondary air to the combustion chamber;

whereby a fire in the combustion chamber can be banked for long term, limited heat output by closing the secondary air inlet at the front wall and adjusting the control valve means to limit the inflow of secondary air through the draft tube to match the inflow of primary air through the primary air inlet.

2. A solid fuel burning heater according to claim 1 in which the cross-sectional width of the heat transfer duct is approximately half the width of the housing.

3. A solid fuel burning heater according to claim 1 in which the draft tube extends through the heating chamber to pre-heat the secondary air transmitted therethrough.

4. A solid fuel burning heater according to claim 1 in which the end portion of the draft tube in the combustion chamber is elevated higher than the portion externally of the housing to prevent convection-induced flow of gases from the combustion chamber to the room.

5. A solid fuel burning heater according to claim 1 in which the main flue crosses directly above the upper, outlet end of the vertical heat transfer duct to enhance further transfer of heat from the main flue to the air exiting from the heat transfer duct.

6. A solid fuel burning heater according to claim 1 having humidifying means comprising an open-top water container having a flat vertical surface in heat-conductive engagement with a flat vertical external wall of the housing, and means for adjusting the vertical position of the container on the wall to vary the evaporation rate of water therefrom.

* * * * *